FIG. 14.

Aug. 6, 1968  D. W. MOYER ETAL  3,395,771
TRACTOR GUIDANCE SYSTEM

Filed May 21, 1965  7 Sheets-Sheet 6

INVENTORS
DONALD W. MOYER
WILLIAM C. SWANSON
JOHN S. LAM

BY  *Walter E. Greavy*
ATTORNEY

Aug. 6, 1968  D. W. MOYER ETAL  3,395,771
TRACTOR GUIDANCE SYSTEM

Filed May 21, 1965  7 Sheets-Sheet 7

INVENTORS
DONALD W. MOYER
WILLIAM C. SWANSON
JOHN S. LAM

BY Walter Gleason
ATTORNEY form
United States Patent Office 3,395,771
Patented Aug. 6, 1968

3,395,771
TRACTOR GUIDANCE SYSTEM
Donald W. Moyer, Downers Grove, and William C. Swanson and John S. Lam, Clarendon Hills, Ill., assignors to International Harvester Company, Chicago, Ill., a corporation of Delaware
Filed May 21, 1965, Ser. No. 457,777
15 Claims. (Cl. 180—79.2)

This invention relates to a system for automatically guiding a tractor in field work such as plowing, planting or cultivating.

An object of the invention is to provide for automatically guiding and controlling a tractor having a hydrostatic steering system in such work.

Another object of the invention is to provide a hydrostatic system for automatically guiding and controlling the operation of such a tractor in relation to a defined marker in the nature of a furrow or groove, such as left by a corn planter marker, for example.

A further object of the invention is to provide such a system for automatically guiding and controlling the tractor in relation to a radioactive tape previously planted below the surface of the field in a desired path.

Another object of the invention is to provide such a system as will normally maintain the tractor in a predetermined path of travel and, in the event of its departure therefrom, return the tractor to such path with manual over-control, thus to provide efficient progressive traversal of the field in the accomplishment of the planned operation.

Other objects of the invention and details of structure and operation thereof will become apparent as the description proceeds in conjunction with the accompanying drawing, of which.

Figure 14:
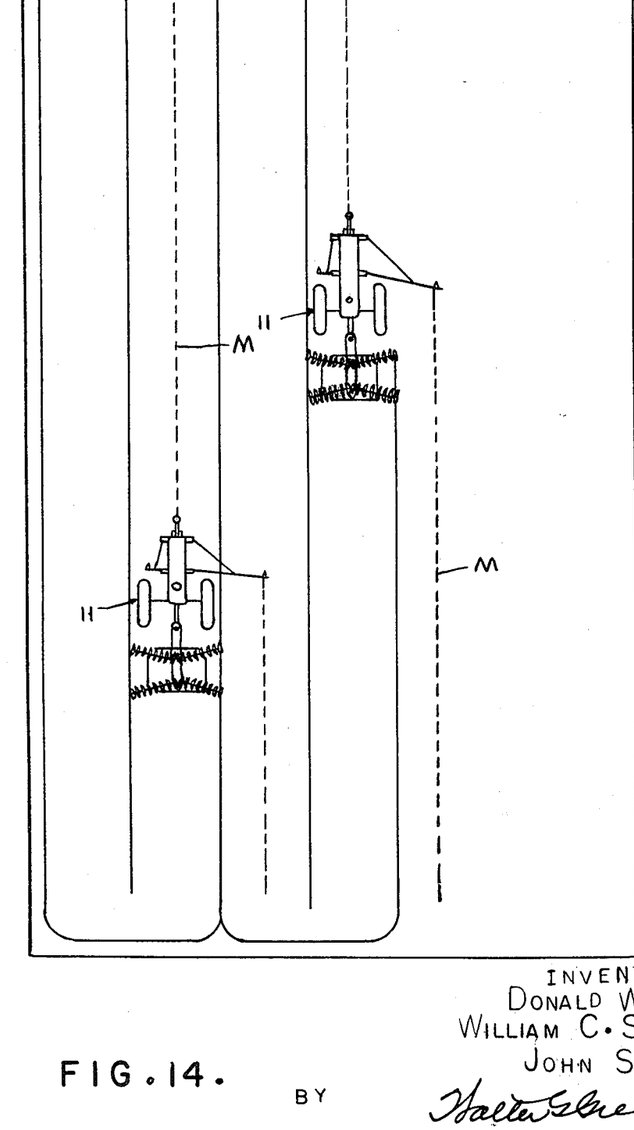
FIG. 14 is a schematic illustration of a plan of operation of a tractor equipped with the form of the invention of FIG. 1.

Referring to the drawings, and particularly to FIGS. 1 to 4 inclusive, tractor 11 is equipped with a generally conventional hydrostatic power steering system 12 under manual control 13 supplemented by an automatic hydrostatic guidance system 14 for controlling the steering of the tractor 11 during certain field operations illustrated in FIG. 14.

Generally in the planned operation it is intended that the working of a given field as in plowing, for example, will be accomplished according to a predetermined plan involving a calculated number of straight-a-way cross runs or traverses with turns at the ends of the runs as illustrated in FIG. 14, the intended runs being indicated by a guide trench or marker groove M impressed by a previous operation such as a corn planter marker. The presence of the marker groove M enables automatic guidance of the tractor 11 during the cross runs with operator over-control at the turns in a manner to be described.

Figures 1, 12:
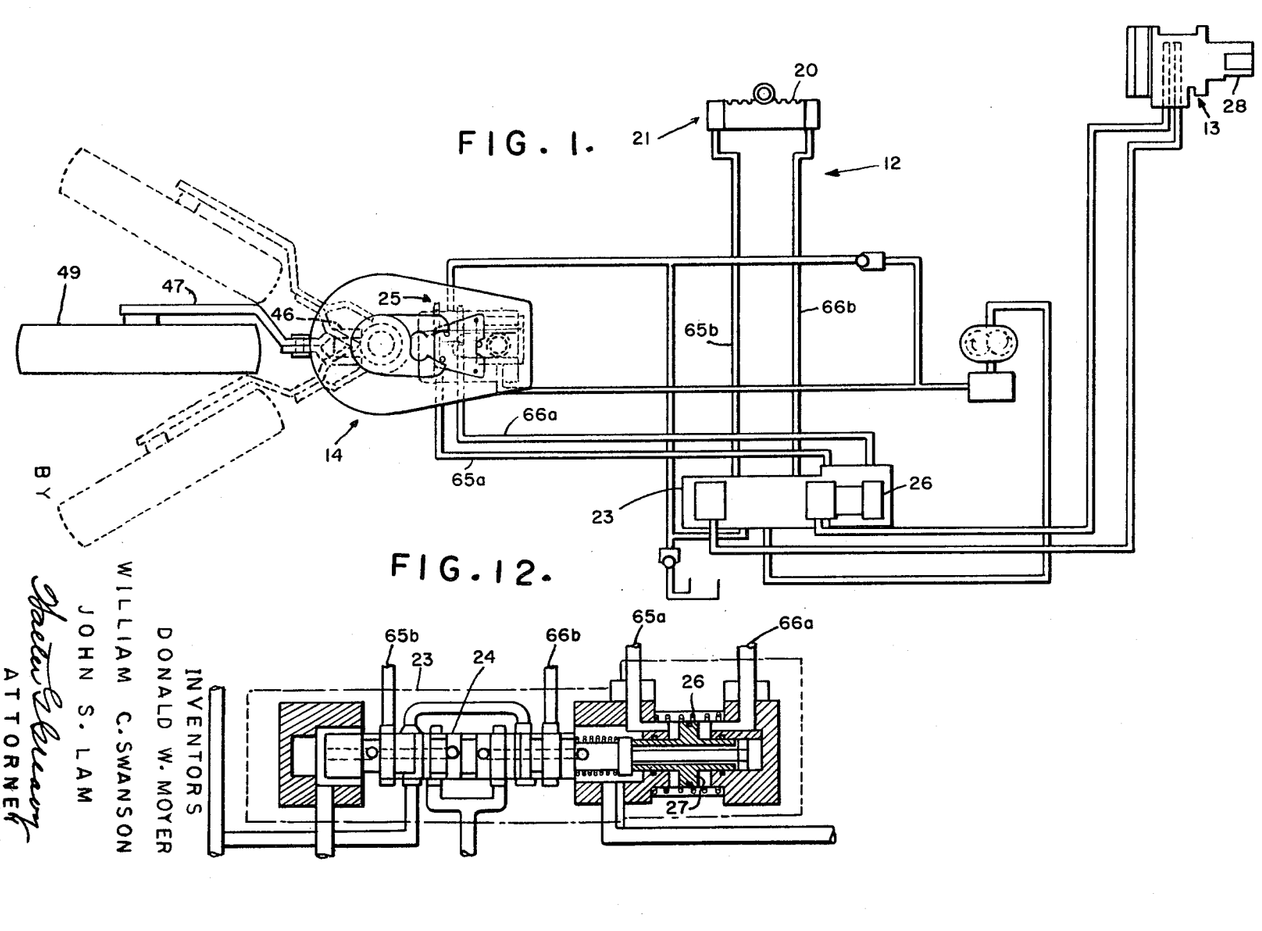
FIG. 1 is a fragmentary schematic diagram of a hydrostatic steering system including one form of the invention.
FIG. 12 is an enlarged view, partially in section, of a portion of the mechanism illustrated in FIG. 1.

Steering system 12 comprises a rack 20 operably connected with the piston of a hydraulic cylinder 21 constituting a reciprocating hydraulic motor and means (not shown) for directing front wheels 22 of tractor 11 in a conventional manner under operative control of steering valve 23.

Valve 23 is operable by means of sliding member or spool 24 which is movable (to the right and the left, in FIG. 12) by fluid pressure under control of (a) valve 25 of automatic guidance system 14 through hydraulic cylinder 26 and piston 27, and (b) manual control through hand pump 28, the latter over-riding the former. Actuation of valve 25 and corresponding operation of valve 23 are effected by mechanism of the invention in the following manner.

Figures 2, 3, 4:
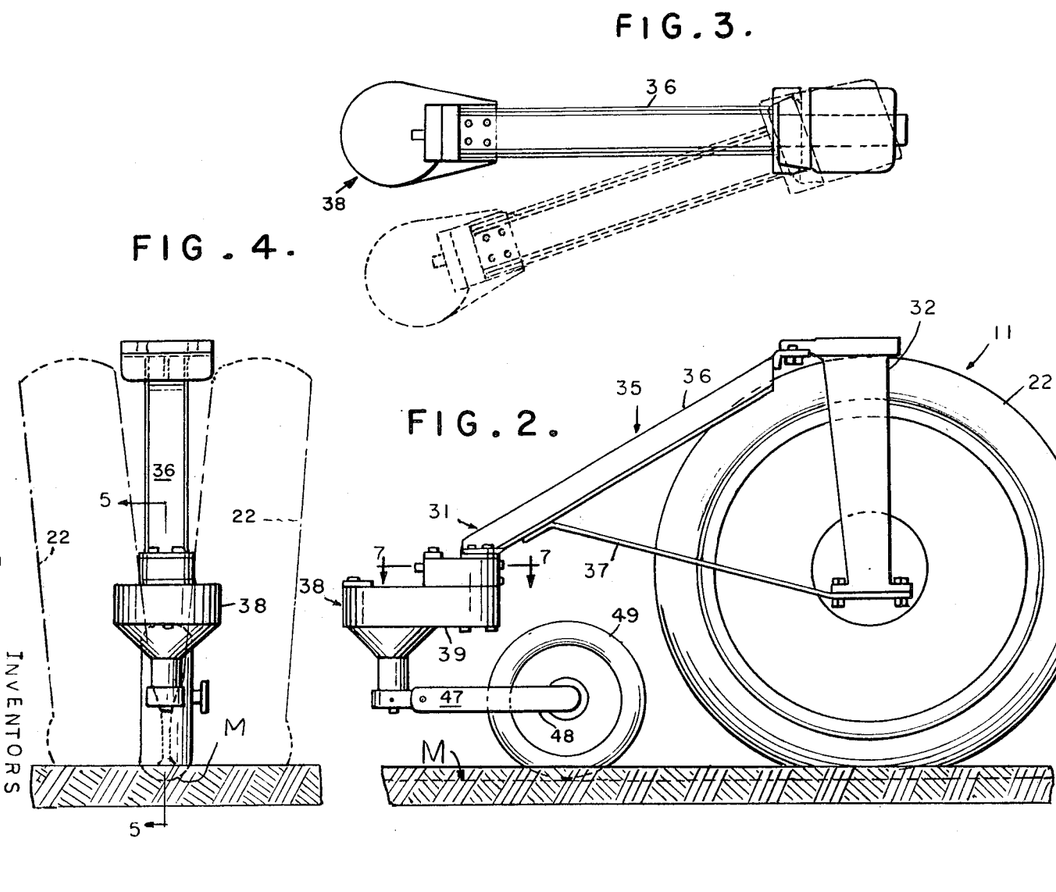
FIG. 2 is a fragmentary side elevational view of a tractor equipped with mechanism embodying one form of the invention.
FIG. 3 is a top plan view of the arrangement shown in FIG. 2 with the addition of broken lines indicating a portion of the mechanism in an operated position.
FIG. 4 is a front elevational view of a portion of the arrangement shown in FIG. 2.

Automatic guidance system 14, as shown in FIGS. 2, 3 and 4, comprises a generally unitary structure 31 supported on the front bolster 32 of tractor 11 for pivotal movement about a generally vertical axis correspondingly with the axles (not shown) supporting the front wheels 22 of the tractor.

The basic hydraulic system (FIG. 1), which includes the usual supply lines, pressure regulator, hand pump and reservoir, and the wheel, axle and bolster arrangement of tractor 11 (FIG. 2) are exemplified in the well-known 806 tractor described in International Harvester Company Operator's Manual of Aug. 30, 1962.

A supporting frame 35 includes a forwardly and downwardly projecting member 36 and angular brace 37 therefor, each supported adjacent its rear extremity on bolster 32 for pivotal movement therewith.

A generally cup shape guidance control housing 38 is secured to frame member 36 adjacent its forward extremity and in depending relation therewith. Bottom wall 39 of housing 38 has an inner boss portion 39a and an outer depending bearing portion 40 with a bore 41 (FIG. 5) therethrough for receiving in rotatable relation therewith a vertically extending shaft 42. Within housing 38 a cam 43 is secured to shaft 42 adjacent the upper extremity thereof, the lower surface of the cam 43 bearing against the upper surface of boss 39a.

Figures 5, 6:
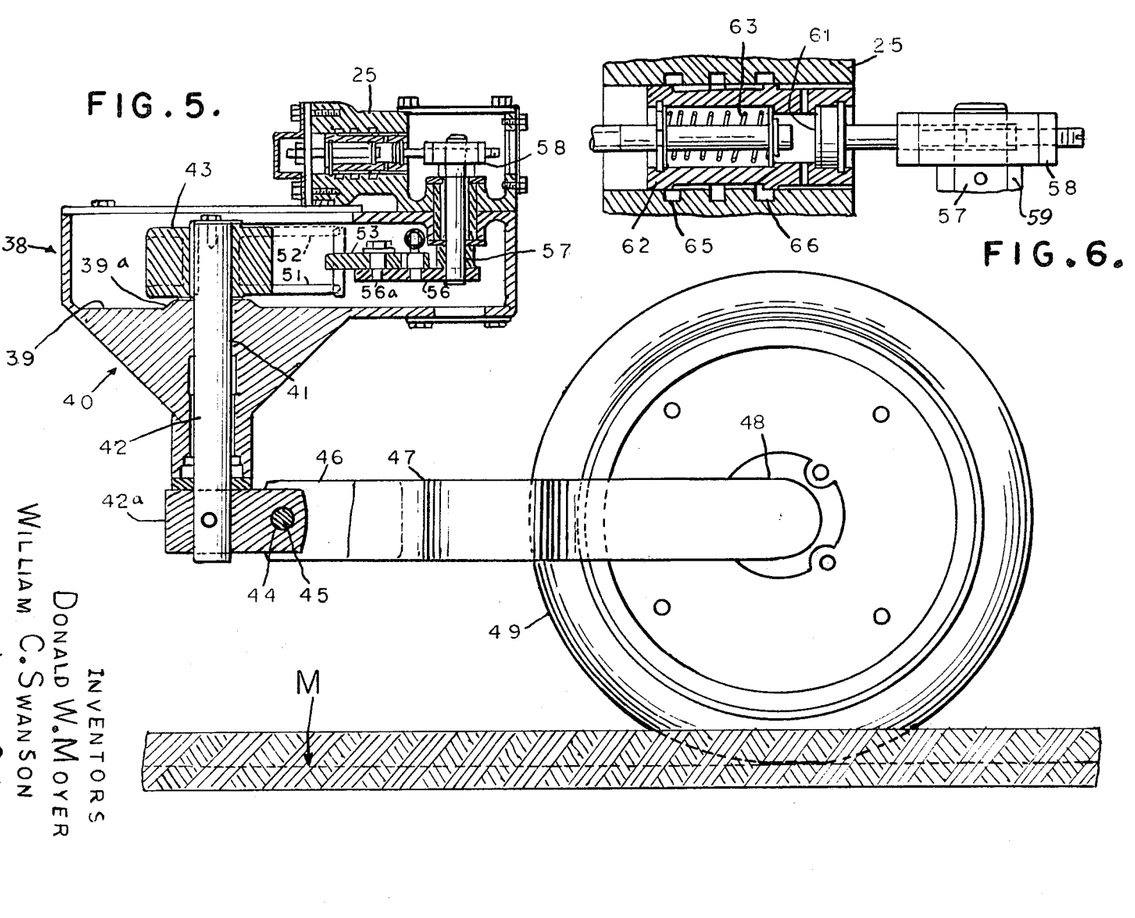
FIG. 5 is a vertical sectional view along the line 5—5 of FIG. 4.
FIG. 6 is an enlargement of a portion of the mechanism shown in FIG. 5.
Figures 7, 8, 9, 10, 11:
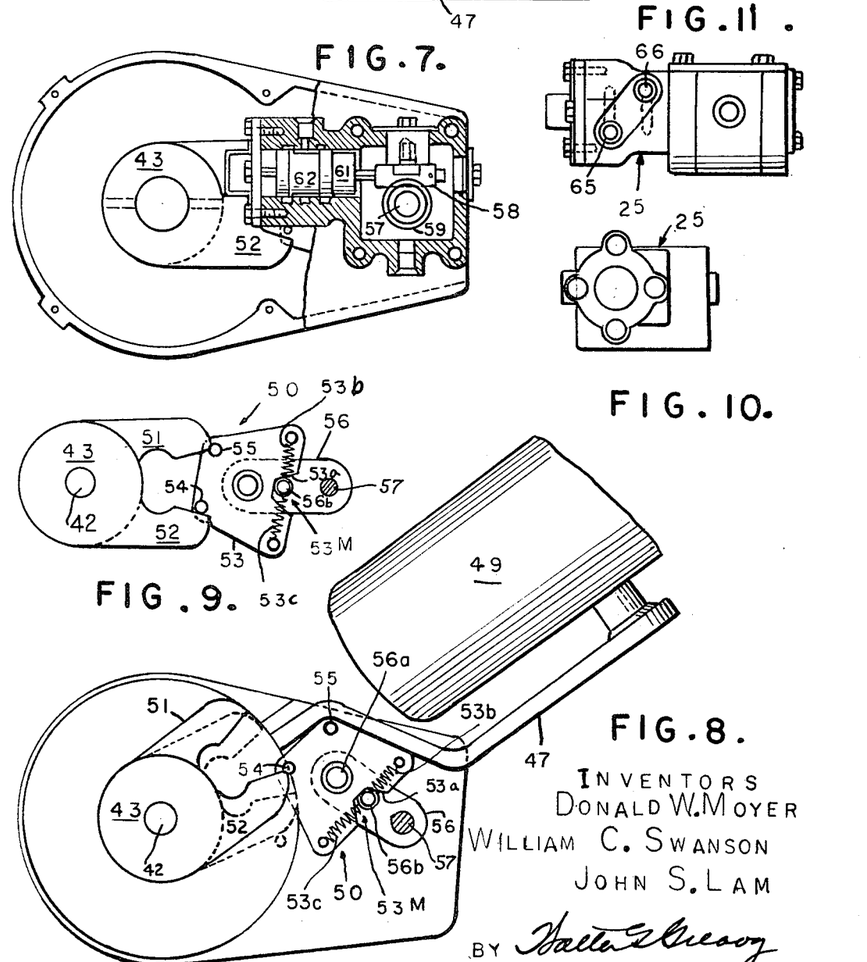
FIG. 7 is a sectional view along the line 7—7 of FIG. 2.
FIGS. 8 and 9 are detail enlarged views showing portions of the invention depicted in FIG. 7 in different positions.
FIG. 10 is an end elevation of a portion of the invention looking to the left in FIG. 2.
FIG. 11 is a top plan view of a portion of the invention shown in FIG. 2.
Figure 13:
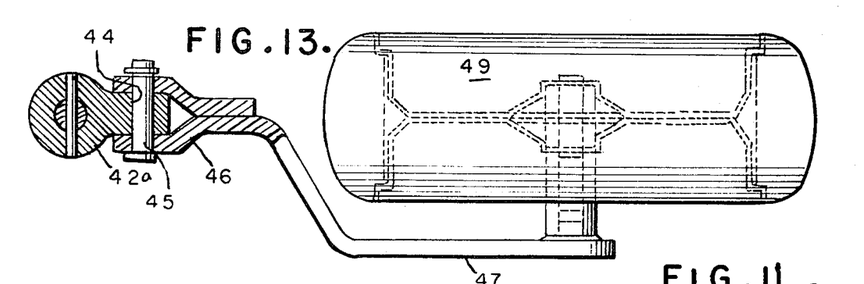
FIG. 13 is an enlarged detail plan view partially in section of a portion of the invention shown in FIG. 5.

Shaft 42 adjacent its lower extremity carries a bracket 42a provided with a bore 44 for receiving a pin 45, which pivotally supports a bifurcated end 46 of an arm 47 whose other end 48 supports a guide wheel or caster 49 in rotative relation. The arrangement is such that caster 49 will freely roll along the ground and particularly within a marker groove M as previously noted, all the while being in pivotal relation with arm 47, the latter in turn being pivotal in relation to pin 45, thus enabling caster 49 freely to bob or move up and down as well as follow changes of direction within groove M. It will be apparent in view of the arrangement described that any change in direction of travel of caster 49 in relation to tractor wheels 22 will result in a corresponding rotation of shaft 42 and cam 43.

Valve 25 is made operatively responsive (FIGS. 5, 7, 8, 9) to pivotal movement of cam 43 by intermediate linkage mechanism 50 comprising spaced cam arms 51, 52, a follower plate 53 provided with spaced pins 54, 55, an arm 56 carried by valve rockshaft 57 for rotation therewith and provided with spaced pins 56a, 56b, and a rack 58 and pinion 59 arrangement. This linkage (to be more fully described) operates upon movement of cam 43, which pivots generally in a horizontal plane to cause corresponding linear movement of valve rod 61 and valve member or spool 62 of valve 25 secured thereto.

Spring 63 is arranged in relation to spool 62 and ports 65, 66 of valve 25 so as to maintain spool 62 when not acted upon by linkage 50 in centered or neutral position. This position obtains when the tractor center line is in predetermined preferred position in relation to the marker groove M; i.e., directly above and in parallel spaced relation therewith. Valve 25 and guidance system 14 are then inactive in relation to valve 23 and steering system 12.

The arrangement of spring 63, however, is such that upon actuation of spool 62 by rod 61 through linkage 50, depending on the direction of movement of cam 43 and rod 61, and resulting opening and closing of ports 65, 66, fluid under pressure will be applied through one or the other of the lines 65a, 66a to piston 27 to move the same and spool 24 thereby to operate valve 23 and in turn through lines 65b, 66b, the reciprocating hydraulic motor, rack 20 and the steering mechanism of the tractor.

The components of the linkage 50 (FIGS. 5, 7, 8, 9) are arranged so that as cam 43 moves with shaft 42 arms 51, 52 will engage pins 54, 55, respectively, depending on the direction of movement, to cause corresponding movement of plate 53, which is mounted on arm 56 of rockshaft 57 for pivotal movement about pin 56a.

For purposes of tolerance and to avoid operation of the hydraulic steering system unnecessarily in response to minor directional changes, relative movement between plate 53 and arm 56 is limited by a lost motion device 53m comprsiing cutaway portion or niche 53a of plate 53 and pin 56b of arm 56 receivable therein, the dimensions of the niche 53a and pin 56b being predetermined in relation to those of the other components of the linkage and steering mechanism to provide the desired tolerance or play. Generally the tolerance will be limited to an angle of 2°, although a greater angle may be selected. When the prescribed angle is expected, spool 62 will move in a direction corresponding to the deviation to bring about the described operation of piston 27 and valve 23.

Springs 53b and 53c are arranged to bias plate 53 in centered relation with cam 43 and arm 56 in the absence of force exerted thereon in consequence of directional changes reflected by caster 49.

Movement of plate 53, subject to the lost motion thus provided, is transmitted through arm 56 to rockshaft 57 and thence through pinion 59 fixed thereon to rack 58 carried by spool 62 of valve 25, so to operate the latter.

In working operation the tractor 11 is manually directed in conventional manner to an appropriate starting position as illustrated in FIG. 14 and set in operation in the desired direction with caster 49 in groove M, the automatic guidance system 14 being operable. As the tractor nears a point of sharp turning the operator ordinarily will direct it, using the hand pump 28 to override system 14 until the turn is completed. It will be noted (FIG. 8) in this connection that caster 49 is free to pivot about shaft 42 through 180° or more in the making of turns, cam arms 51, 52 being arranged to disengage from pins 54, 55, respectively, upon selected angular movement of shaft 42 and cam 43, and to return to engaged position upon completion of the turn.

Figures 15, 16:
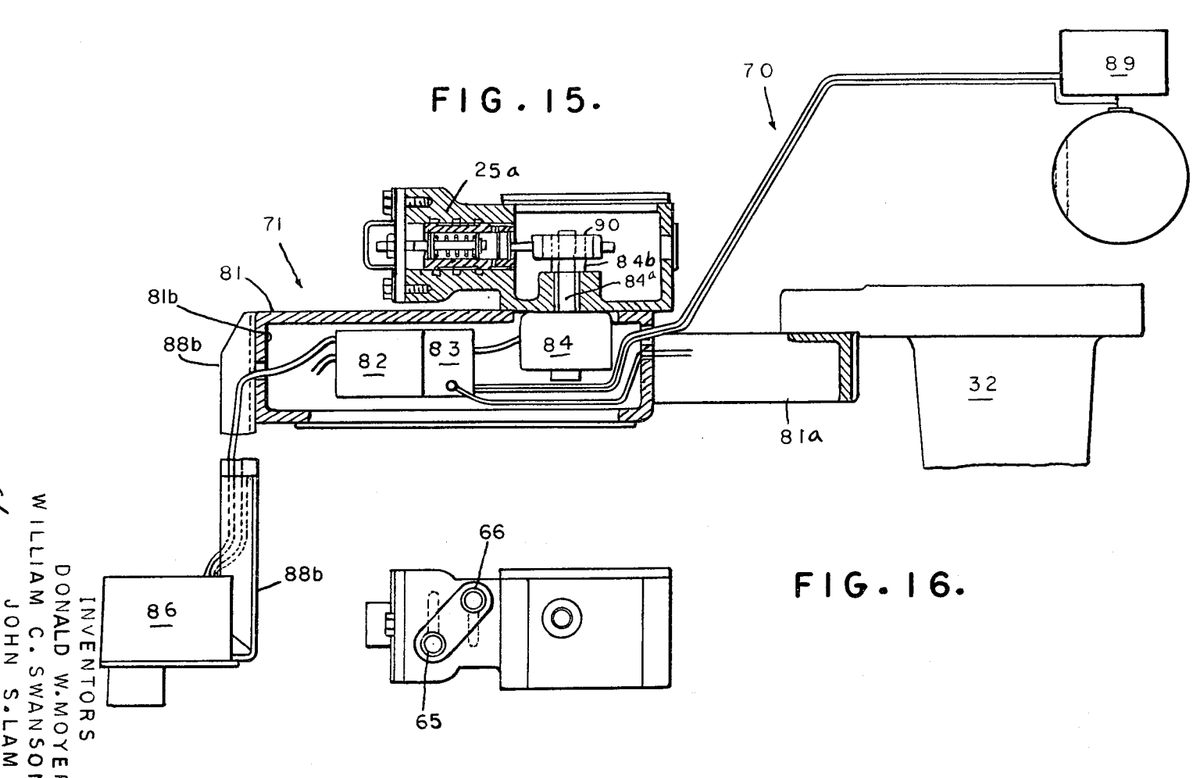
FIG. 15 is a fragmentary schematic illustration of another form of the invention partially in section.
FIG. 16 is a top plan view of a portion of the invention shown in FIG. 15.
Figure 17:
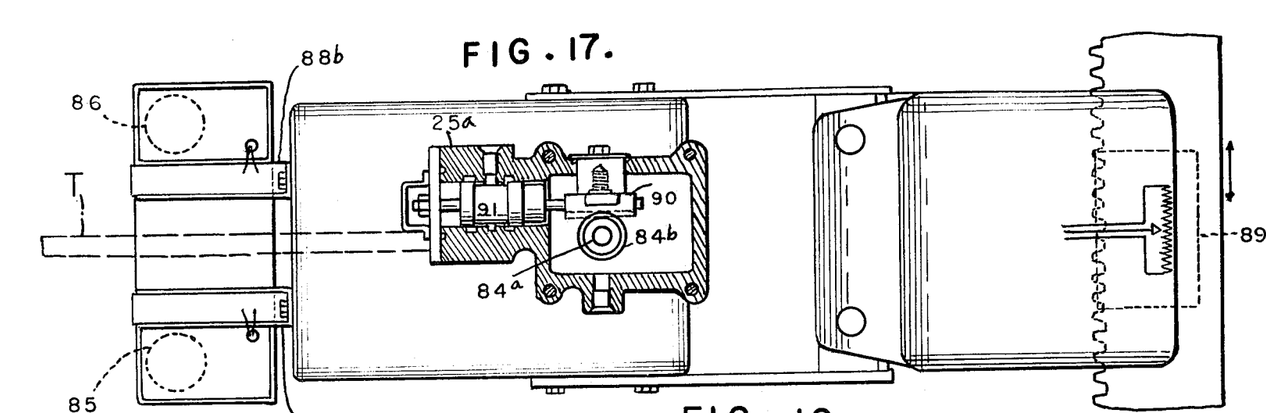
FIG. 17 is a top plan view of a portion of the invention shown in FIG. 15 partially in section.
Figure 18:
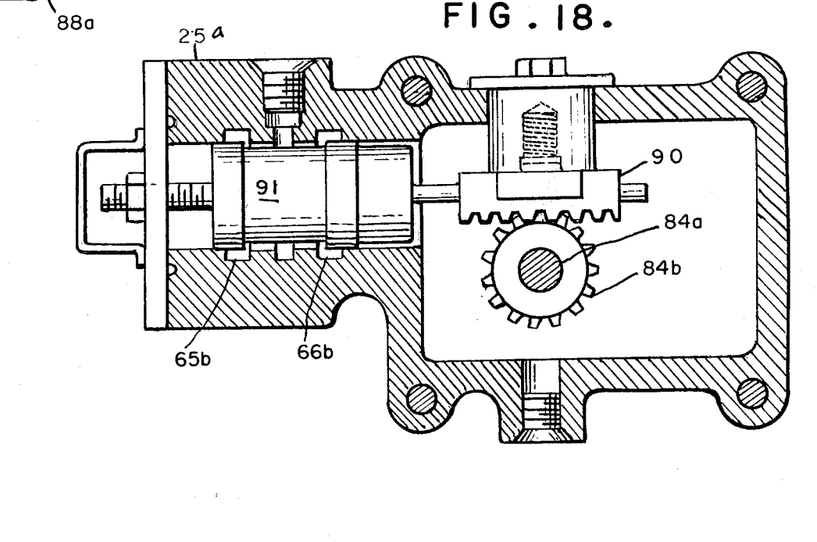
FIG. 18 is an enlarged view of a portion of the invention shown in FIG. 17.

The modified form of the invention illustrated in FIGS. 15, 16, 17 includes the same basic hydraulic system and wheel, axle and bolster arrangement. Instead of the marker groove, caster, cam and linkage arrangement for operating valve 25 and the hydrostatic steering system 12 previously described, this modified form utilizes an electronic sensor and servo motor system in conjunction with a radioactive marker for operating a modified valve 25a, which, except for the manner of its actuation by a servo motor, functions correspondingly with valve 25, in relation to valve 23 and the steering system 12.

Referring to FIGS. 15, 16, 17, and 18, a suitable radioactive tape T is planted below ground in the desired path. This tape is preferably of wasting material such that it will be suitably radio-active for a single season only, thus averting complications in subsequent seasons of different planting.

The automatic guidance system 70 comprises a unitary electrical and mechanical structure 71 mounted on bolster 32 of tractor 11 for pivotal movement therewith and with axles (not shown) of wheels 22.

The generally cup shape guidance control housing 81 is supported forwardly of bolster 32 by bracket 81a. Suitably arranged in the housing with appropriate circuitry and operative in well known manner are a conventional sensor differential amplifier 82, a servo control box 83, and a servo motor 84 having a vertical rotary output shaft 84a with a pinion 84b mounted adjacent its upper extremity for rotation therewith.

Twin radiation sensors 85, 86 in electrical communication with amplifier 82 are supported forwardly of housing 81 by depending arms 88a, 88b, respectively, secured to forward wall 81b thereof in suitably spaced relation with the center line of the tractor and the ground or surface of travel. Feed-back potentiometer 89 of conventional design, in dual circuit with control box 83, which is in circuit with amplifier 82 and servo motor 84, is arranged to register for purposes of comparative evaluation an electrical value or signal reflecting the position of the steering piston and hence the direction of travel of the tractor 11.

Sensors 85, 86 and the guidance system 70 of which they form a part are preferably so arranged to operate as generally to maintain the tractor in a path of travel directly over tape T and in which sensors 85 and 86 will be equidistant from tape T. Then electrical signals or impulses of equal magnitude are picked up from tape T by the sensors 85, 86 and transmitted to amplifier 82, where, being of equal value, they nullify one another. In this condition of operation the hydrostatic steering system 12 is unaffected by guidance system 70.

In the event of departure of the tractor 11 from the intended path of travel due to irregularities of terrain or other reason causing one sensor to be more remote than the other from tape T a differential in their respective signal values will appear. This differential balance is transmitted through control box 83 to feed-back potentiometer 89, which, operating in well-known manner, resolves the differential value in relation to the counter value reflecting the position of the steering piston. The resulting signal, evaluating the departure of the tractor 11 from the intended path, is correspondingly transmitted to control box 83 and thence to servo motor 84, which is thereupon actuated appropriately to correct the direction of travel of the tractor.

This is accomplished by mechanism operated upon rotation of servo motor shaft 84a and pinion 84b in response to energization from control box 83 conformably with the signal returned to it by potentiometer 89. Rotation of pinion 84b, which engages rack 90, causes corresponding movement of spool 91 of valve 25a, producing the application of fluid pressure in cylinder 21 as in the first form of the invention and consequent actuation of rack 20 and corrective operation of the steering apparatus returning the tractor to the desired path of travel.

Conventional means are provided in the potentiometer for limiting return signals to signals reflecting a deviation from the selected path of two degrees or other selected tolerance as in the case of the lost motion device 53m.

Manual overcontrol of valve 25a may be accomplished in the manner described in connection with guidance system 14, utilizing hand pump 28.

Although the invention has been described in relation to certain embodiments, it will be understood that alterations and variations thereof are allowable within its intended scope as defined in the claims which follow.

We claim:

1. A guidance system for automatically controlling hydrostatic power steering apparatus of a tractor having a reciprocating hydraulic motor therein and having at least one front wheel rotative about a horizontal axle, said axle being pivotal about a vertical axis responsive to the operation of the reciprocating hydraulic motor of said apparatus, said apparatus including hydraulic circuitry and a valve in said circuitry having a spool operatively connected with the piston of a fluid pressure motor for controlling the operation of the reciprocating hydraulic motor of said apparatus, said system comprising a hydro-mechanical unit carried by said tractor for pivotal movement with said axle about said axis, said unit including
    (a) a housing disposed forwardly of said tractor,
    (b) a depending shaft supported by said housing for relative rotation about a vertical axis,
    (c) a guide caster supported by said shaft in predetermined spaced relation with said shaft and said wheel, said caster being rotative about one horizontal axis and pivotal about another horizontal axis in predetermined spaced relation with said one horizontal axis, said caster also being pivotal about said vertical axis of said shaft,
    (d) a cam mounted on said shaft for rotation therewith,
    (e) an actuator valve for controlling actuation of said piston and including a spool spring-biased in neutral position,
    (f) said actuator valve having pressure fluid inlet and outlet ports in operative communication with corresponding ports of said fluid pressure motor,
    (g) linkage mechanism operatively interconnecting said cam and said actuator valve spool whereby upon predetermined movement of said cam in one direction, and another, said actuator valve spool moves correspondingly to open and close the ports of said actuator valve, respectively, and thus to operate the same and to actuate said fluid pressure motor thereby to actuate said first valve and cause the reciprocating hydraulic motor of said steering apparatus to be operated correspondingly,
    (h) said caster being arranged to travel in a ground marker groove indicating a selected path of travel for said tractor, and said cam being pivotally responsive to changes in direction of travel of said caster.

2. A tractor guidance system as described in claim 1 in which
    (a) the cam comprises a plurality of spaced arms,
    (b) said linkage mechanism comprises a follower plate having a plurality of spaced pins thereon in engageable relation with said arms, respectively,
    (c) said actuator valve spool carries a rack,
    (d) a rockshaft is supported by said housing for relative rotation about a vertical axis,
    (e) a pinion is mounted on said rockshaft for rotation therewith and in cooperative relation with said rack to actuate said actuator valve spool,
    (f) an arm is carried by said rockshaft for pivotal movement about the axis of rotation of said rockshaft and in spaced relation with said pinion,
    (g) a plurality of spaced pins is carried by said arm,
    (h) said follower plate being mounted on said arm for rotation about one of the pins thereof and having a peripheral cutaway portion in predetermined spaced relation with said one pin and another of the pins of said arm being receivable within said cutaway portion to limit movement of said follower plate in relation to said arm and to provide lost motion therebetween,
    said parts being so conformed and arranged to operate whereby changes in the direction of travel of said guide caster are communicated to the valve controlling the operation of the reciprocating hydraulic motor of the hydrostatic power steering apparatus to cause said apparatus to be operated to change the direction of travel of the tractor accordingly.

3. A tractor guidance system as described in claim 2 in which the cam, the follower plate and the arm and their associated parts are so conformed and arranged as to enable said pivotal movement of the guide caster and cam about said vertical axis through 360 degrees.

4. A tractor guidance system as described in claim 2 in which the cam, the follower plate and the arm and their associated parts are so conformed and arranged to operate whereby to provide through lost motion tolerance of predetermined minor changes of direction of travel of said guide caster thereby withholding communication of said minor changes to said valve controlling operation of the reciprocating hydraulic motor of said hydrostatic steering apparatus.

5. A tractor guidance system as described in claim 1 in which the hydrostatic power steering apparatus includes manually operable means for controlling the operation thereof, said manually operable means being adapted to override said actuator valve.

6. A guidance system for automatically guiding in a selected path a tractor equipped with conventional hydrostatic power steering apparatus including hydraulic circuitry and a hydraulic control valve in said circuitry for steering said wheels, a steering device hydraulically connected to said hydraulic control valve and operative for actuating said valve for steering said wheels, said hydraulic control valve comprising a housing mounted on the tractor and having a movable valve member therein, auxiliary hydraulic valve actuating means mounted on said housing and operative for mechanically transmitting motion to said movable valve member to move the latter and actuate said hydraulic control valve to steer said wheels and an additional valve in operative communication with said circuitry and having a spool operatively connected with the piston of a fluid pressure motor for controlling the operation of said apparatus independently of said steering device, said tractor having at least one front wheel rotative about a horizontal axle and said axle being pivotal about a vertical axis upon operation of said apparatus under control of said valve, said system comprising a hydro-electronic unit carried by said tractor for pivotal movement with said axle about said axis, said unit including
    (a) electrical circuitry with a source of electrical energy,
    (b) a plurality of spaced sensor elements in said circuitry adapted to pick up signals from a radioactive source indicating a selected path of travel for said tractor,
    (c) a differential amplifier in communication with said sensors for receiving and resolving signals therefrom,
    (d) a servo control box in communication with said differential amplifier for receiving therefrom signals as resolved thereby,
    (e) a feed-back potentiometer reflecting a value predicated on the posture of the steering apparatus as indicated by the position of said piston and in dual communication with said servo control box and arranged to receive signals therefrom and to weigh them against said value and to remit to the servo control box a signal reflecting the result of such weighing, (f) a servo motor in communication with said servo control box for receiving therefrom a signal corresponding to that remitted by said potentiometer, (g) said servo motor having an output shaft operatively connected with said valve spool whereby upon predetermined movement of said shaft in one direction, and another, said valve spool moves correspondingly to open, and close, the ports of said additional valve and to actuate said auxiliary hydraulic valve actuating means thereby to cause said steering apparatus to be operated conformably with the signal received by said servo motor.

7. A tractor guidance system as described in claim 6 in which the servo motor output shaft rotates in one direction, and another, depending on the value of the signal communicated to it by said signal box, and the operative connection between said servo motor output shaft and said valve spool comprises a pinion rotative with said shaft and a rack operatively connected with said valve spool and in mesh with said pinion, the parts being so conformed and arranged to operate that rotative movement of said servo motor output shaft in one direction, and another, causes corresponding linear movement of said valve spool.

8. A tractor guidance system as defined in claim 6 in which the potentiometer includes adjustable means restricting the remission of signals to signals having a value exceeding a selected minimum.

9. A tractor guidance system as defined in claim 6 in which the potentiometer includes adjustable means limiting the remission of signals to signals reflecting a differential of sensor signals indicating a deviation of the tractor from the selected path of travel exceeding a selected tolerance.

10. A tractor guidance system as described in claim 6 in which the hydrostatic power steering apparatus includes manually operable means for controlling the operation thereof, said manually operable means being adapted to override said servo motor output shaft.

11. In a tractor having steerable wheels and hydraulic power steering means including hydraulic circuitry and a hydraulic control valve in said circuitry for steering said wheels, a steering device hydraulically connected to said hydraulic control valve and operative for actuating said valve for steering said wheels, said hydraulic control valve comprising a housing mounted on the tractor and having a movable valve member therein, auxiliary hydraulic valve actuating means mounted on said housing and operative for mechanically transmitting motion to said movable valve member to move the latter and actuate said hydraulic control valve to steer said wheels, sensing means mounted on the tractor and operative for sensing deviations from a guide line and being movable relative to said wheels in response to deviations in the normal path of the wheels from a guide line, and means including a combination of mechanical and hydraulic means operatively connecting said sensing means to said auxiliary valve actuating means for actuating said hydraulic control valve independently of said steering device.

12. The invention described in claim 11 and further characterized in that the movable member of said control valve is axially slidable, and the auxiliary valve actuating means includes an axially slidable member operably engageable with the movable member of said control valve.

13. The invention described in claim 12 and further characterized in that the axially slidable member of said actuating means is fashioned as the piston of a fluid pressure motor.

14. The invention described in claim 11 and further characterized in that said sensing means comprises a hydro-mechanical unit carried by the tractor for pivotal movement relative thereto.

15. The invention described in claim 11 and further characterized in that said sensing means comprises a hydro-electronic unit carried by the tractor for pivotal movement relative thereto.

References Cited

UNITED STATES PATENTS

| | | | |
|---|---|---|---|
| 2,925,875 | 2/1960 | Bourdon | 180—79.2 |
| 2,990,902 | 7/1961 | Cataldo | 180—79.2 |
| 3,117,642 | 1/1964 | Larinoff | 180—79.2 |

BENJAMIN HERSH, *Primary Examiner.*

J. A. PEKAR, *Assistant Examiner.*